US008419409B2

(12) United States Patent
Milot et al.

(10) Patent No.: US 8,419,409 B2
(45) Date of Patent: Apr. 16, 2013

(54) MOLDING STATION WITH DEFORMABLE MOLD AND METHOD

(75) Inventors: Éric Milot, Montréal (CA); John McCoy, Port Perry (CA)

(73) Assignee: D.I.T. Equipments Inc., St-Basile-le-Grand (CA)

( * ) Notice: Subject to any disclaimer, the term of this patent is extended or adjusted under 35 U.S.C. 154(b) by 688 days.

(21) Appl. No.: 12/519,599

(22) PCT Filed: Dec. 20, 2007

(86) PCT No.: PCT/CA2007/002345

§ 371 (c)(1),
(2), (4) Date: Jun. 17, 2009

(87) PCT Pub. No.: WO2008/074156

PCT Pub. Date: Jun. 26, 2008

(65) Prior Publication Data

US 2009/0315216 A1 Dec. 24, 2009

Related U.S. Application Data

(60) Provisional application No. 60/871,180, filed on Dec. 21, 2006.

(51) Int. Cl.
*B29C 43/02* (2006.01)
*B29C 43/34* (2006.01)

(52) U.S. Cl.
USPC ........... 425/193; 425/260; 425/353; 425/448; 425/DIG. 44

(58) Field of Classification Search .................... 425/78, 425/193, 218, 219, 260, 345, 353, 447–448, 425/DIG. 44
See application file for complete search history.

(56) References Cited

U.S. PATENT DOCUMENTS

| | | | | |
|---|---|---|---|---|
| 3,604,075 | A | 9/1971 | Locke | |
| 3,883,109 | A | 5/1975 | Hahne | |
| 4,036,574 | A | 7/1977 | Jakobs | |
| 4,802,836 | A * | 2/1989 | Whissell | 425/253 |
| 5,074,774 | A * | 12/1991 | Nose et al. | 425/148 |
| 5,672,363 | A * | 9/1997 | Sagawa et al. | 425/413 |
| 6,068,465 | A * | 5/2000 | Wilson | 425/345 |

FOREIGN PATENT DOCUMENTS

WO WO 01/43936 6/2001

* cited by examiner

*Primary Examiner* — Richard Crispino
*Assistant Examiner* — Thukhanh Nguyen
(74) *Attorney, Agent, or Firm* — Goudreau Gage Dubuc; Gwendoline Bruneau

(57) ABSTRACT

A molding station and method comprising a hopper having a mouth closable with at least a lower door and a mold to be filled, the hopper and the mold being movable to a filling position in which the hopper is closed by the lower door; the lower door then opening to allow an amount of moldable material to be released into the mold; the mold being made in a deformable material, so that an interior volume of the mold is temporarily reduced when releasing the moldable material into the mold.

19 Claims, 33 Drawing Sheets

MOLDING STATION WITH DEFORMABLE MOLD AND METHOD

CROSS-REFERENCE TO RELATED APPLICATIONS

This application is a National Entry Application of PCT application no CA2007/002345 filed on Dec. 20, 2007 and published in English under PCT Article 21(2), which itself claims priority on U.S. provisional application Ser. No. 60/871,180, filed on Dec. 21, 2006. All documents above are incorporated herein in their entirety by reference.

FIELD OF THE INVENTION

The present invention relates to molded articles. More specifically, the present invention relates to a molding station and a method for molding articles.

BACKGROUND OF THE INVENTION

Concrete articles are typically molded at high speed in molding stations incorporating a filling station, and filling of and molding in the mold are usually done on the same spot.

Recently, filling stations comprising an upper door and a lower door have been developed, which allows an increased surface quality of the upper surface of the molded articles (surface opposite the closed bottom of the mold) by reducing an aspiration effect upon opening of the doors, as well as an increased control of the filling of the molds from the filling hopper.

Ongoing efforts for improvement relate to increase the quality of the lower outer surface of the articles, i. e. molded in the bottom of the mold, since it is a visible part of the articles.

Moreover, recurrent problems of overfilling of the mold are still unresolved.

SUMMARY OF THE INVENTION

More specifically, there is provided a molding station, comprising a container of moldable material, having a mouth closable with at least a lower door, and a mold to be filled with the moldable material; at least one of: i) the container and ii) the mold being movable into a filling position in which the container is closed by the lower door, the lower door opening to allow an amount of the moldable material to be released into the mold, wherein the mold is made in a deformable material, an interior volume of the mold being temporarily reduced when releasing the moldable material thereinto.

There is further provided a molding station, comprising a container of moldable material, the container having a lower door closing a mouth thereof, and an upper door located above the lower door and defining a compartment therebetween; and a mold to be filled with the moldable material; the container and the mold being brought into a filling position in which the container is closed by the lower door, the compartment comprises a first amount of material and the upper door is closed; the lower door opening to allow the first amount of the moldable material to be released from the compartment into the mold, the upper door then opening to allow a second amount of the moldable material to be released into the mold; wherein the mold is made in a deformable material, an interior volume of the mold being temporarily reduced when releasing the moldable material thereinto.

There is further provided a molding station comprising a container of a moldable material, the container having a lower door closing a mouth thereof, and an upper door located above the lower door; a feedbox movable between the upper door and the lower door of the feedbox; and a mold to be filled with the moldable material; wherein the container, the feedbox and the mold are brought into a filling position in which the container and the mold are separated by the feedbox, the upper door and the lower door is closed and the feedbox contains a first amount of the moldable material; the lower door then opening to allow the first amount of material to be released from the feedbox into the mold; and the upper door further opening to release a second amount of material into the mold, the lower door and the upper door shutting closed when the mold is filled, the lower door and the feedbox being then withdrawn and the mold and the container returned to a separated position; wherein the mold is made in a deformable material, an interior volume thereof being temporarily reduced when releasing the moldable material thereinto.

There is further provided a method for filling a mold with a moldable material, comprising the acts of bringing a container of moldable material, the container having a mouth closable with a lower door, and a mold to be filled with the moldable material into a filling position in which the container is closed by the lower door; reducing an interior volume of the mold; opening the lower door to allow an amount of the moldable material to be released into the mold; closing back the lower door when the mold is filled; and withdrawing the mold.

There is further provided a mold for molding an article, wherein the mold is made in a deformable material, an interior volume thereof being temporarily reduced when pouring a moldable material thereinto.

Other objects, advantages and features of the present invention will become more apparent upon reading of the following non-restrictive description of specific embodiments thereof, given by way of example only with reference to the accompanying drawings.

DESCRIPTION OF EMBODIMENTS OF THE INVENTION

The present system and method generally allow controlling overfilling of the mold.

Figure 1:
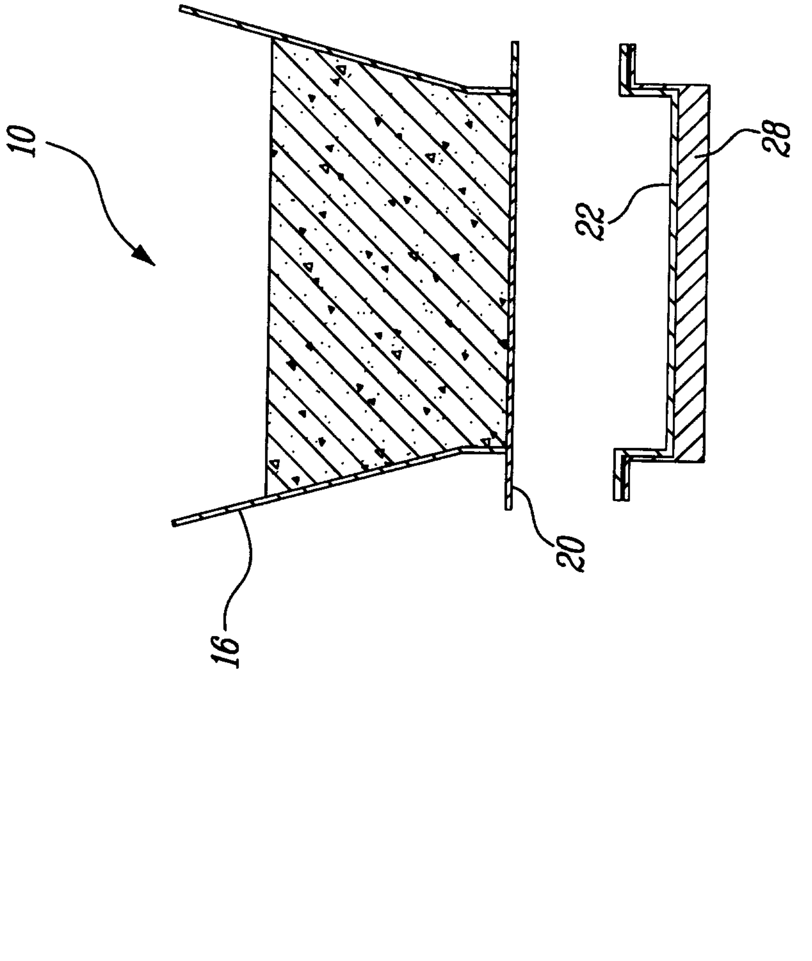
FIGS. 1 to 8 illustrate acts of an embodiment of a method according to an aspect of the present invention.

In a first embodiment of an aspect of the present invention, as shown in FIGS. 1 to 7, a molding station 10 comprises a supply of moldable material such as a hopper 16, a lower door 20 and a mold 22 (FIG. 1).

The mold 22 is typically made in urethane or flexible polyurethane, for easy demolding as well as for surface finish, or neoprene, natural rubber etc, for example.

Figure 2:
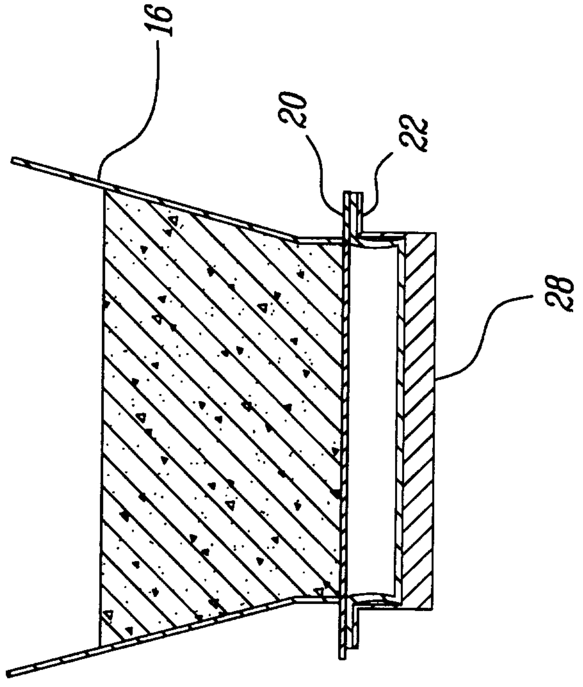
Figure 3:
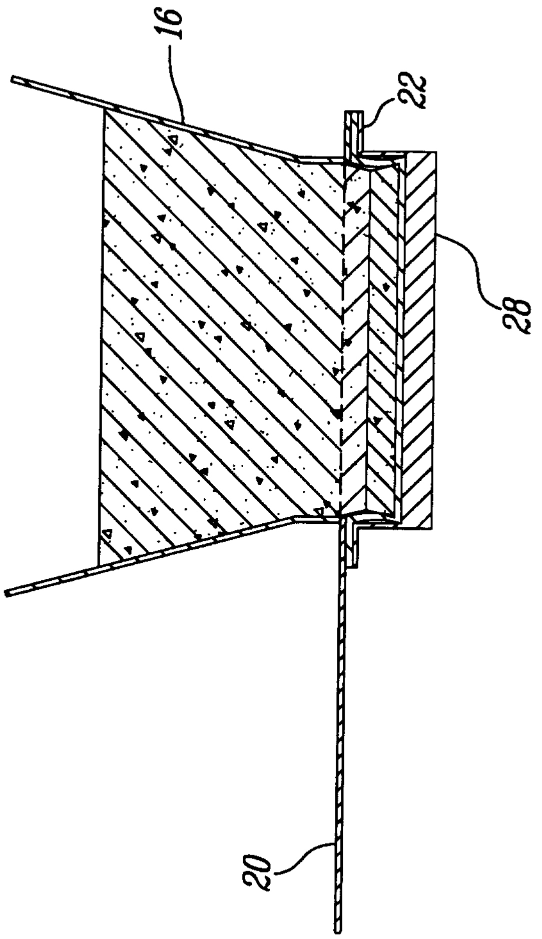
Figure 4:
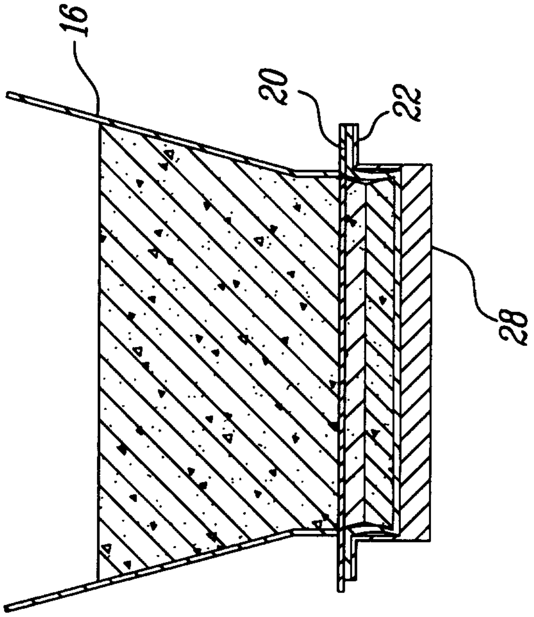
Figure 5:
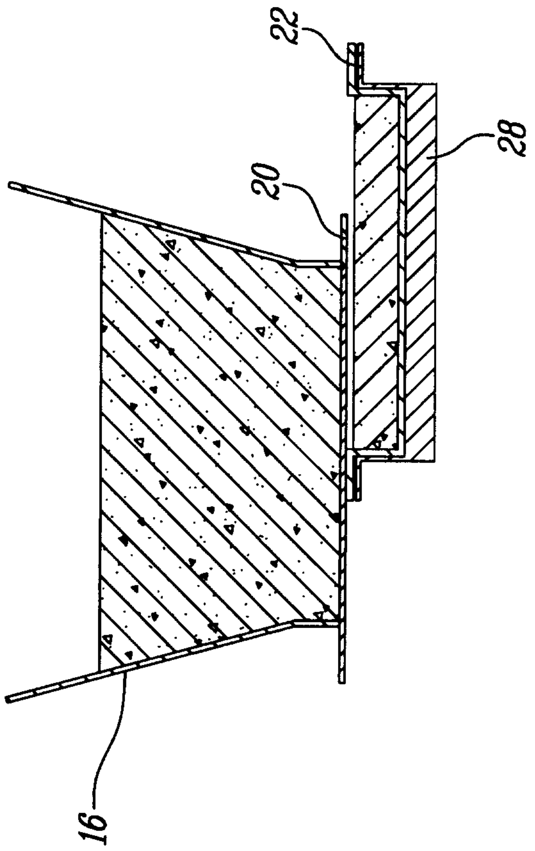
Figure 6:
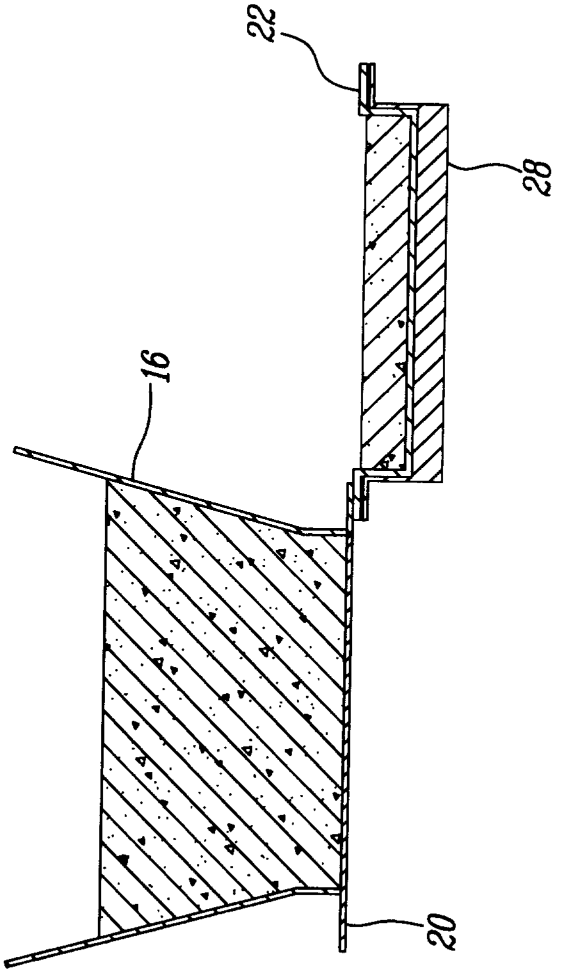
Figure 7:
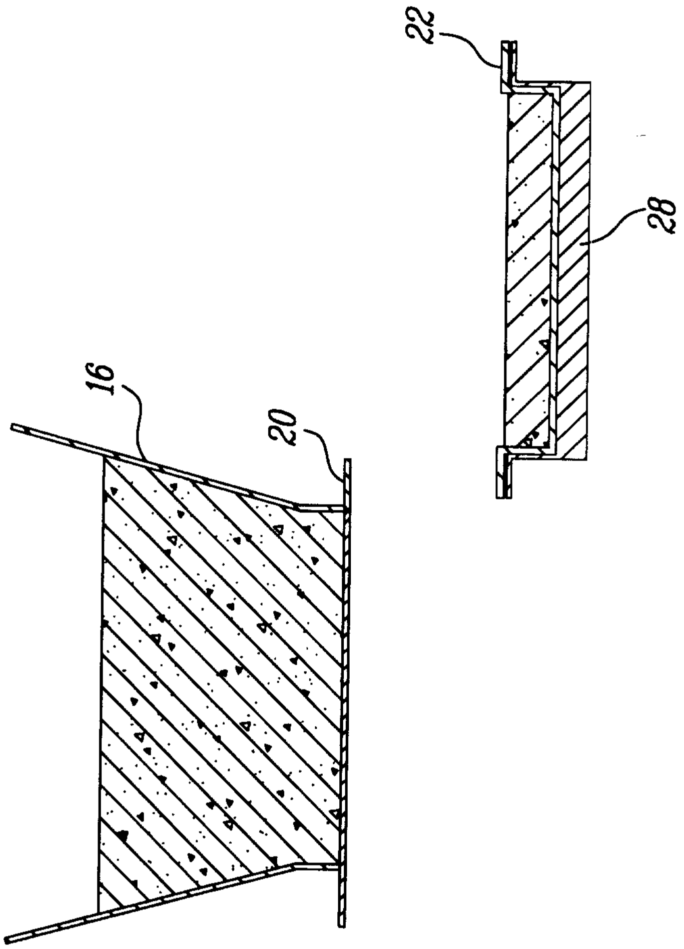
Figure 8:
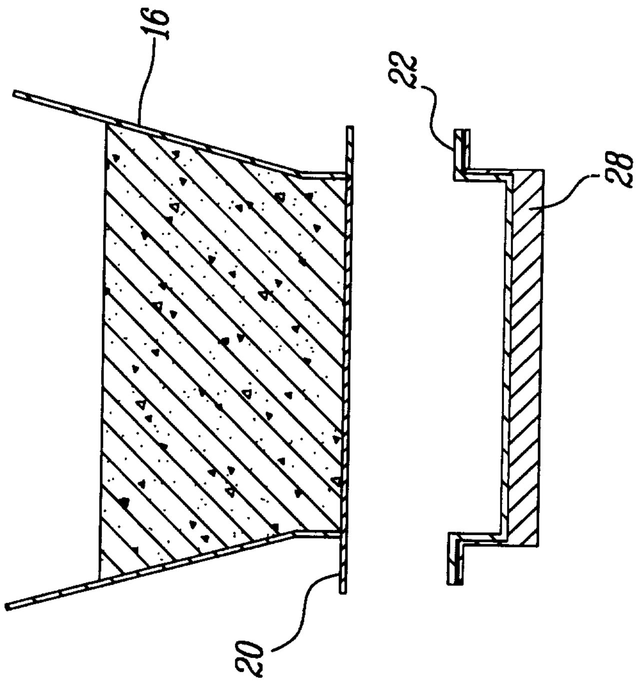

The mold 22 and the hopper 16 are brought in a filling position, in which the lower door 20 closes the mouth of the hopper 16 and the mold 22 is in position beneath the lower door 20 (FIG. 2). A wet moldable material, such as concrete, plaster, clay or sand-lime for example, is contained in the hopper 16 when the lower door 20 is in the closing position. Then the lower door 20 is opened so that material pours down from the hopper 16 into the mold 22 (FIG. 3). When the mold 22 is full, the lower door 20 is brought back into the closed position, between the mouth of the hopper 16 and the mold 22 (FIG. 4) and the mold 22 is withdrawn from under the closed lower door 20, as shown in FIGS. 5 to 7, leaving the place to a next mold 22 to be filled (FIG. 8). This next mold 22 may be filled along the same acts as described hereinabove.

The lower door 20 may be actuated by sets of pneumatics and/or hydraulics as known in the art.

In FIGS. 1 and 2, the mold 22 and the hopper 16 are brought into the filling position by a movement of the mold 22 relative to the hopper 16. However, the mold 22 could be fixed and the hopper 16 displaceable.

As can be seen in the Figures, the mold 22 is provided with a support 28 made in a material allowing compressing the mold 22 as the mold is being filled. As a result, due to a slight buckling of the sidewalls of the mold 22 as seen in FIGS. 2-6 under action of the support 28, the interior volume of the mold 22 is reduced prior to releasing the material therein, and overfilling of the mold 22 is thus avoided.

Other ways of reducing the interior volume of the mold 22 prior to releasing the material therein may be contemplated, as will be described hereinbelow, for example in relation to FIGS. 20(*b*) and 22(*b*).

Alternatively, it may be contemplating having the mold fixed into position and the hopper coming into the filling position with the lower door closed above the mold, and submitting the mold to compression during pouring of the moldable material.

Another way may be to have empty molds being fed in a line under the hopper, with the lower door closed, through a passage putting them in a slight compression, for the pouring of the moldable material.

It is to be noted that upon withdrawal of the mold 22, once filled, from under the hopper 16, a scraping action by the closed lower door 20 on the upper surface of the mold 22 further contributes to avoid overfilling of the mold 22 by removing any material in excess, if any.

Figure 9:
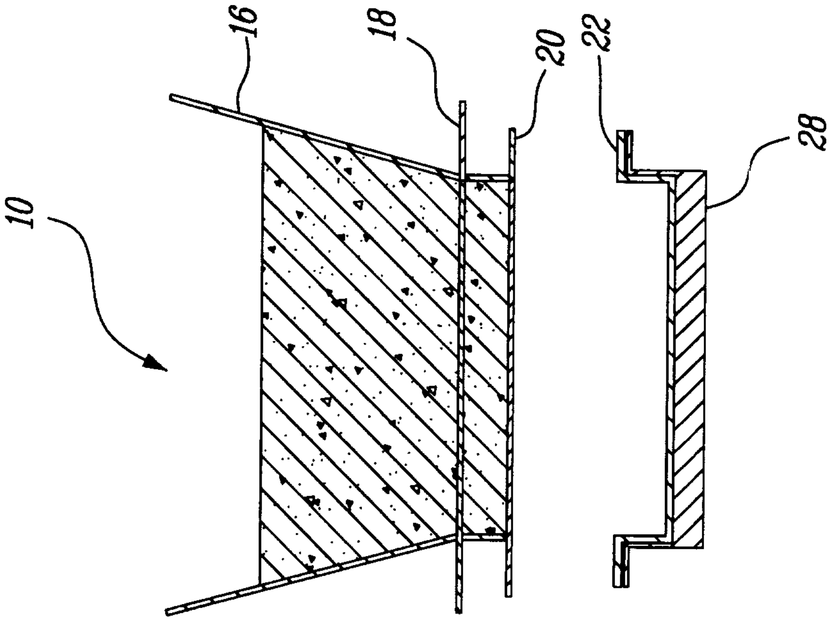
FIGS. 9 to 17 illustrate acts of another embodiment of a method according to an aspect of the present invention.
Figure 10:
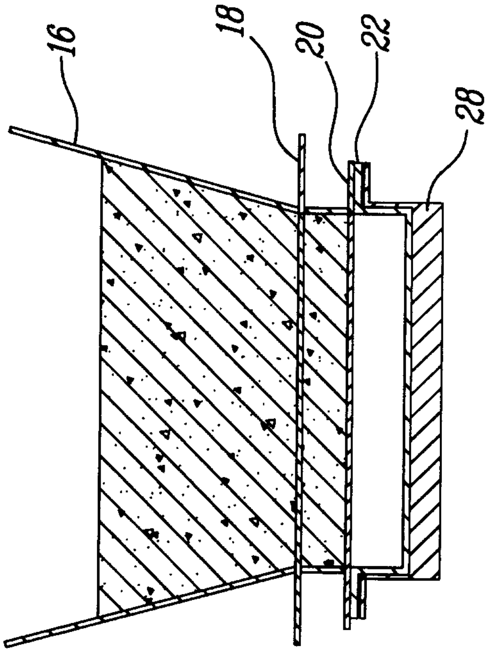

In a second embodiment illustrated in FIGS. 9 to 17, the hopper 16 further comprises an upper door 18, separated from the lower door 20 by a neck of the hopper 16 (see FIG. 9). Material may be fed to the hopper with the upper door 18 open and the lower door 20 closed, then this upper door 18 closed, thereby defining a compartment full of material in between the two closed doors 18, 20 (FIGS. 9 and 10 for example).

Figure 11:
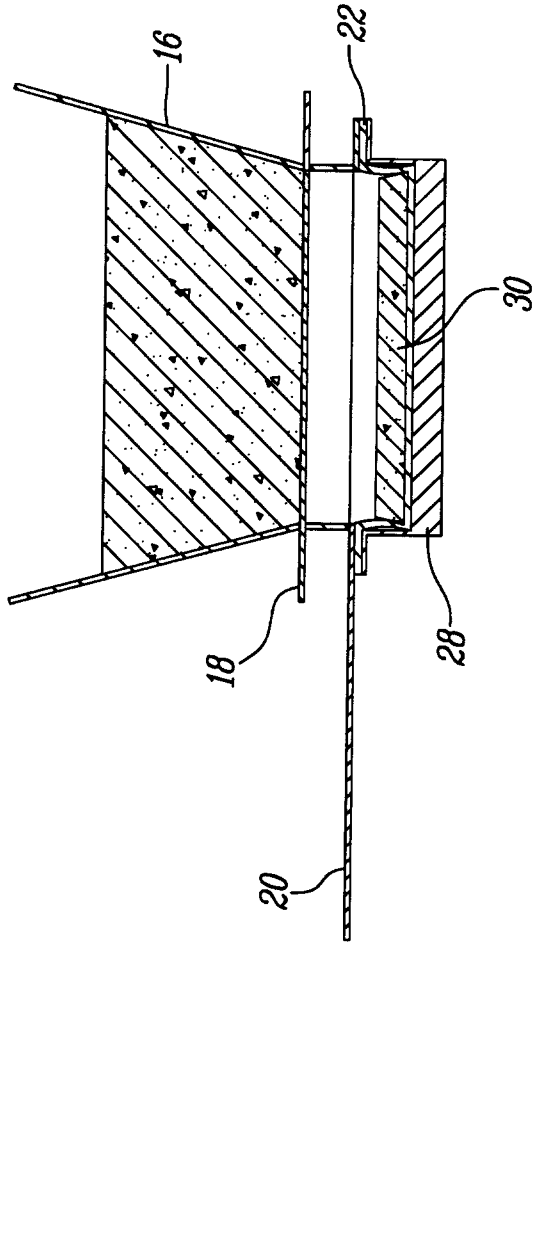
Figure 12:
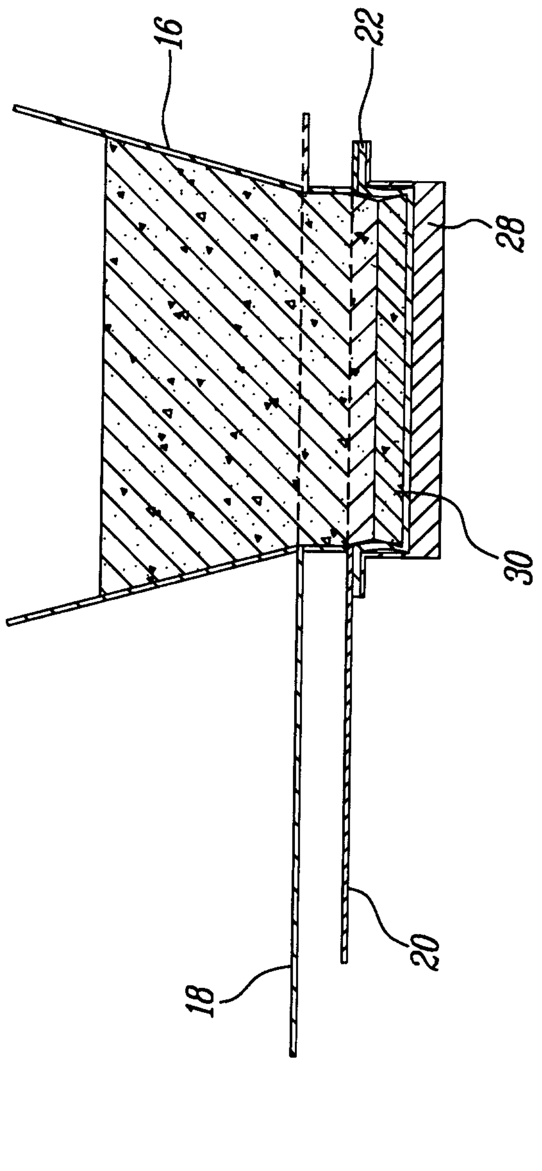
Figure 13:
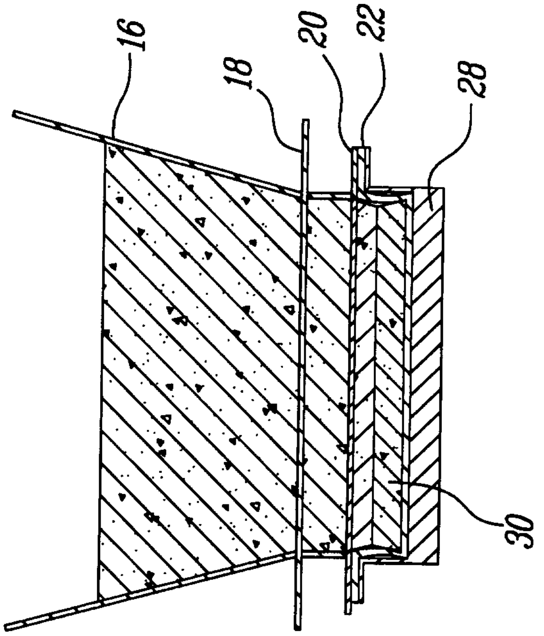
Figure 17:
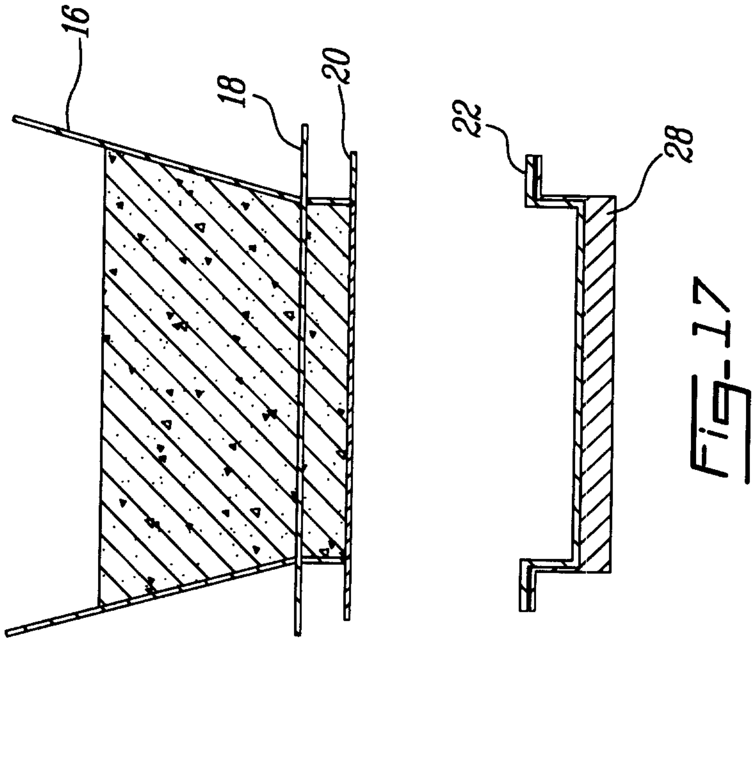

Then, as shown in FIG. 11, as the lower door 20 is opened, the material of this compartment pours down into the mold 22, as a first amount 30 of material. The upper door 18 may then be opened to complete filling of the mold 22 (see FIG. 12). Then the lower and upper doors 20, 18 are brought back into the closed position (see FIG. 13) and the mold 22 is withdrawn from under the closed lower door 20 as shown in FIGS. 14 and 15, leaving the hopper 16 with a full compartment ready for a next mold to be filled (FIG. 17).

Again, the interior volume of the mold 22 may be decreased prior to pouring the material therein, by a pression submitted by a support 28, for example.

Figure 14:
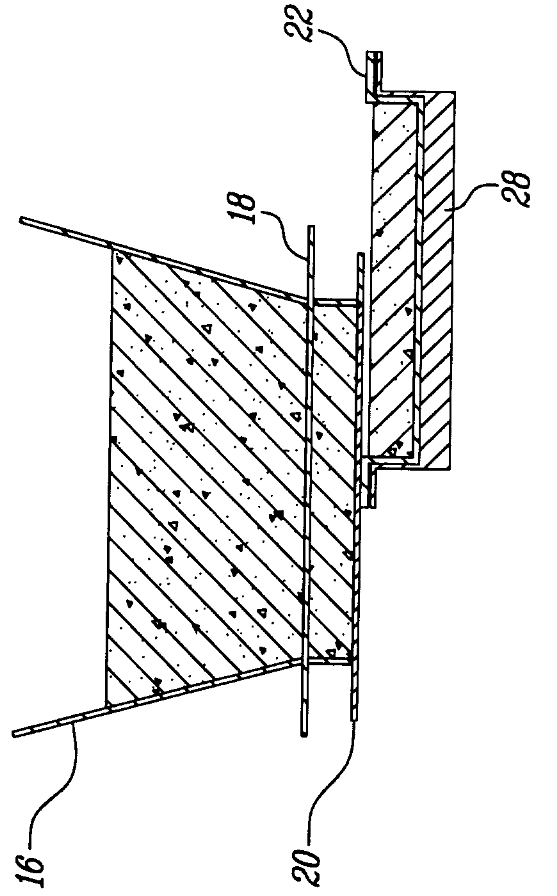
Figure 15:
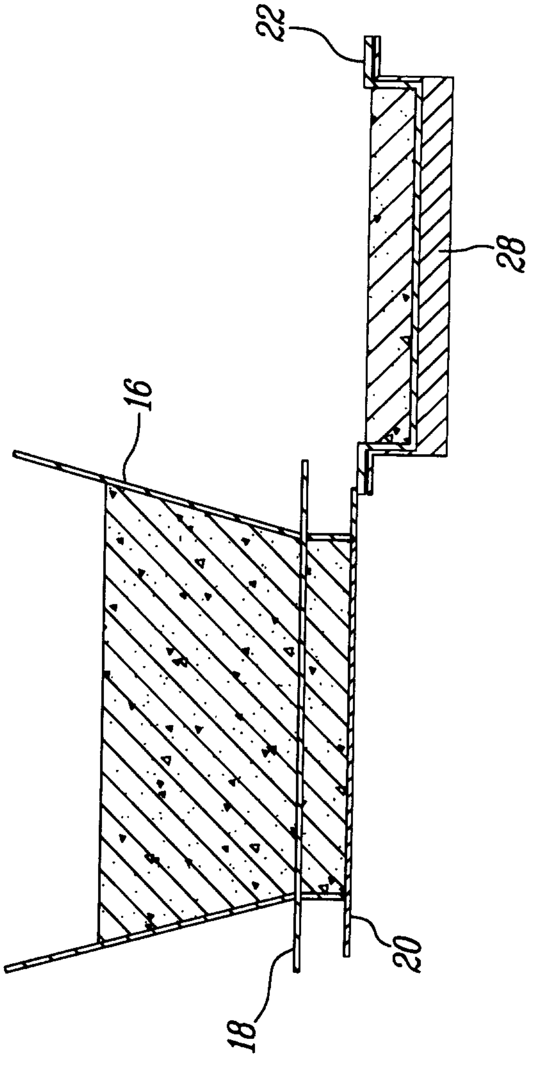
Figure 16:
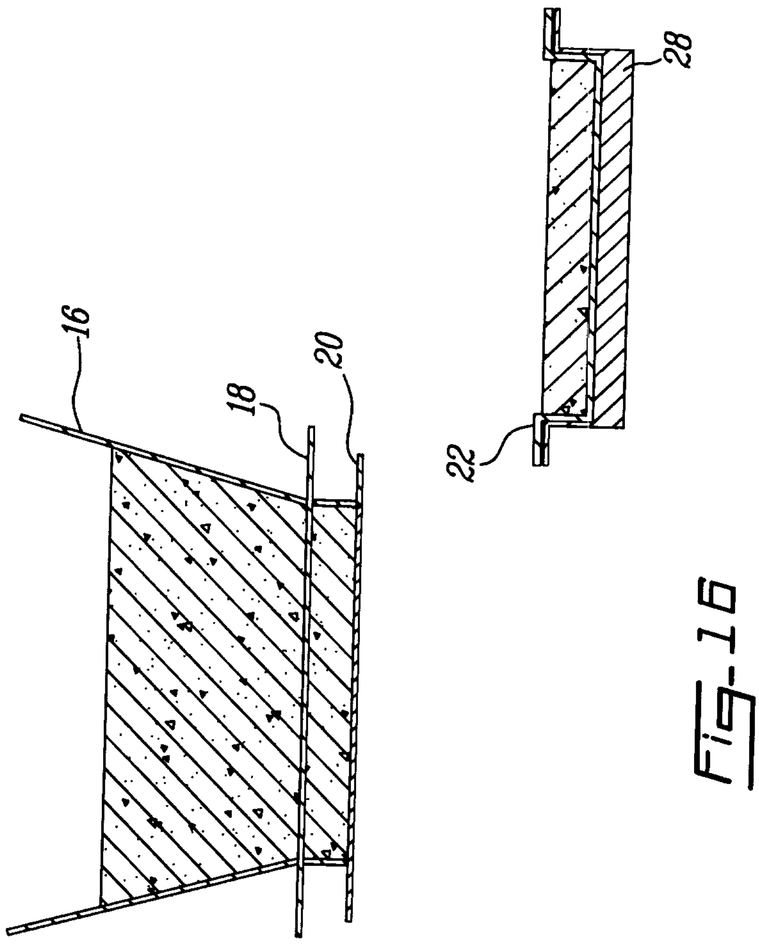

Again, it is to be noted that upon withdrawal of the full mold from under the hopper 16 in FIG. 14, a scraping action by the closed lower door 20 on the upper surface of the mold 22 may further contribute to avoid overfilling of the mold 22.

Furthermore, in this embodiment, the pouring of the material takes place in several stages, which may be beneficial, especially in the case of deep molds, as people in the art will appreciate.

In a further embodiment described in FIGS. 18 to 28, a movable feedbox 26 is provided between the upper door 18 and the lower door 20.

Each one of the upper and lower doors 18 and 20 may be actuated by sets of pneumatics and/or hydraulics as known in the art.

The wet moldable material is contained in the hopper 16 when the upper door 18 is in the closing position, and the feedbox 26 may be filled with material upon opening the upper door 18.

Figure 18:
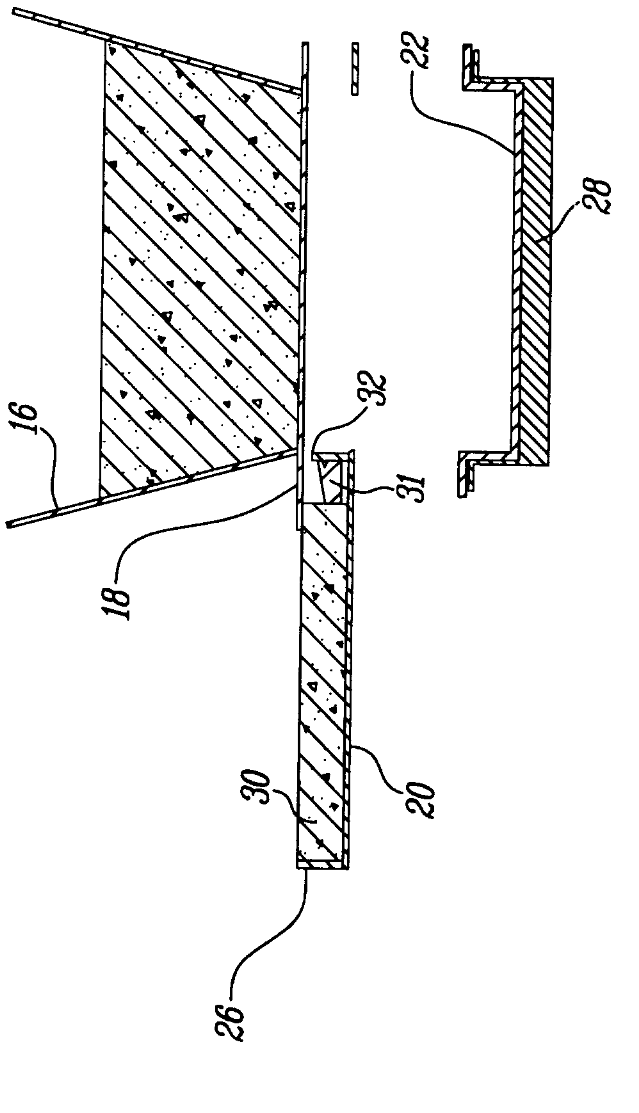
FIGS. 18 to 28 illustrate acts of still another embodiment of a method according to an aspect of the present invention.
Figure 19:
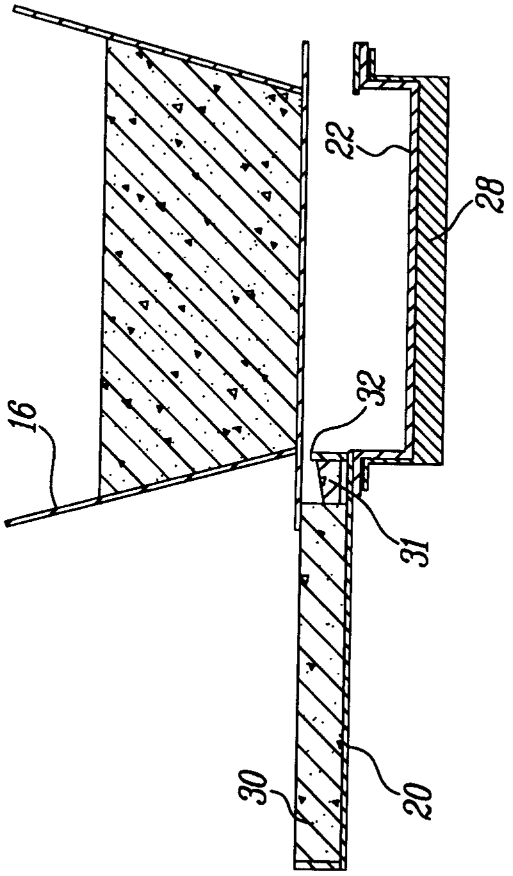

Here, prior to releasing a first amount of the moldable material from the feedbox 26, the feedbox 26, containing this first amount of wet moldable material 30, is prepared in position on the upper surface of the lower door 20 in the open position, the upper door 18 being closed, the mold 22, empty, being in a low position (see FIG. 18).

Figure 20A:
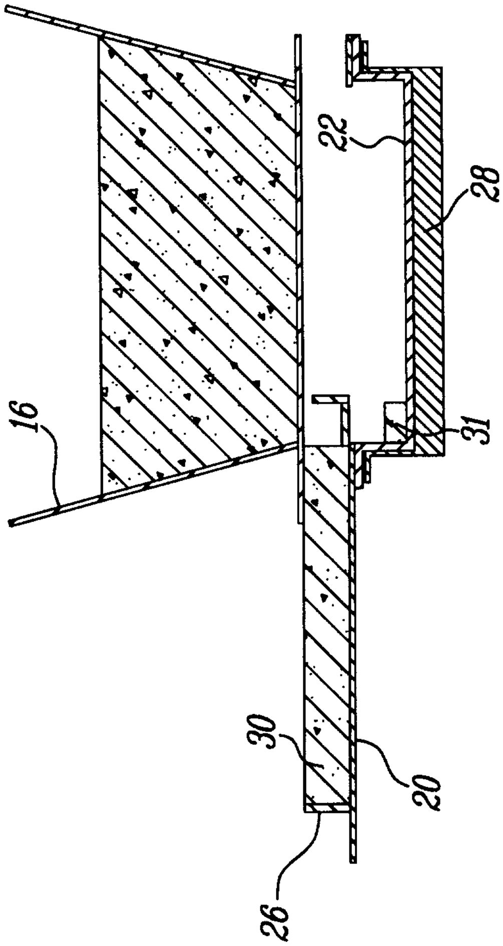
Figure 20B:
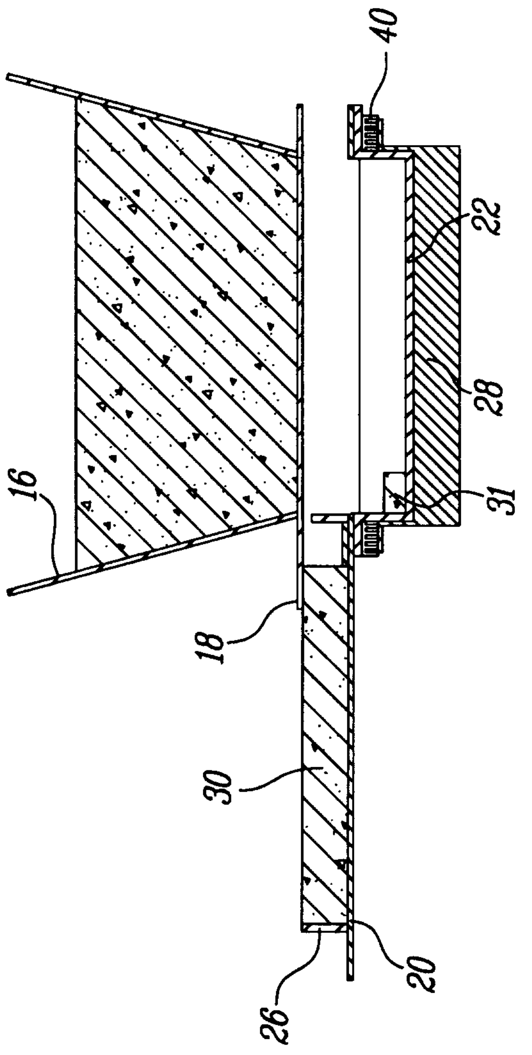
Figure 21:
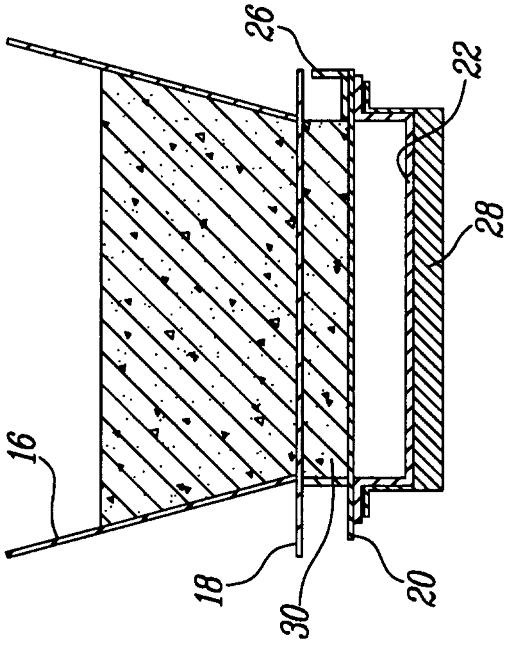
Figure 22A:
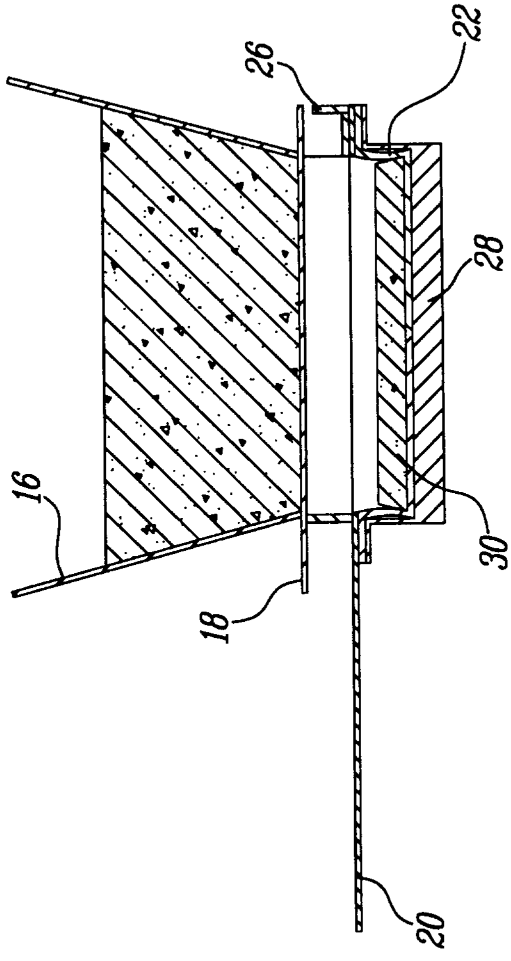
Figure 22B:
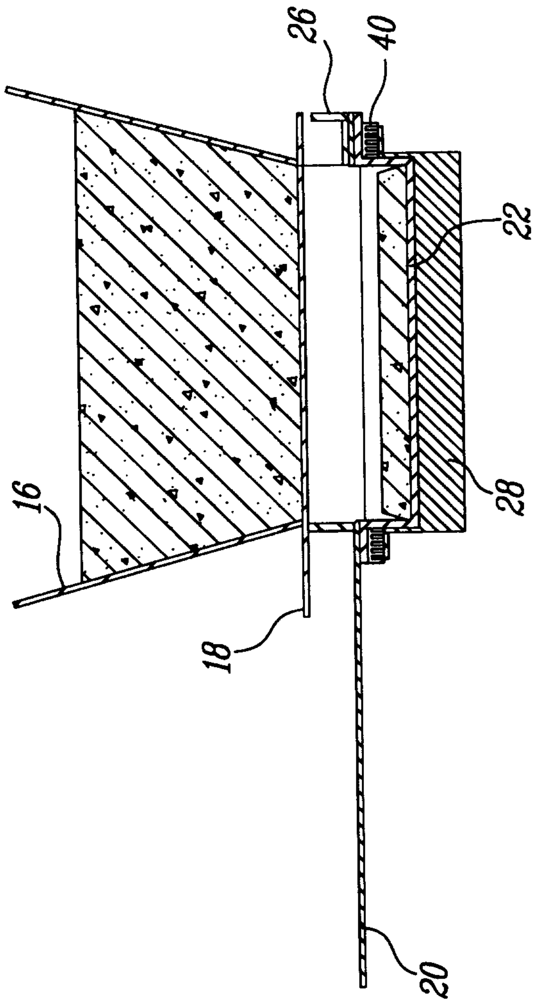
Figure 23:
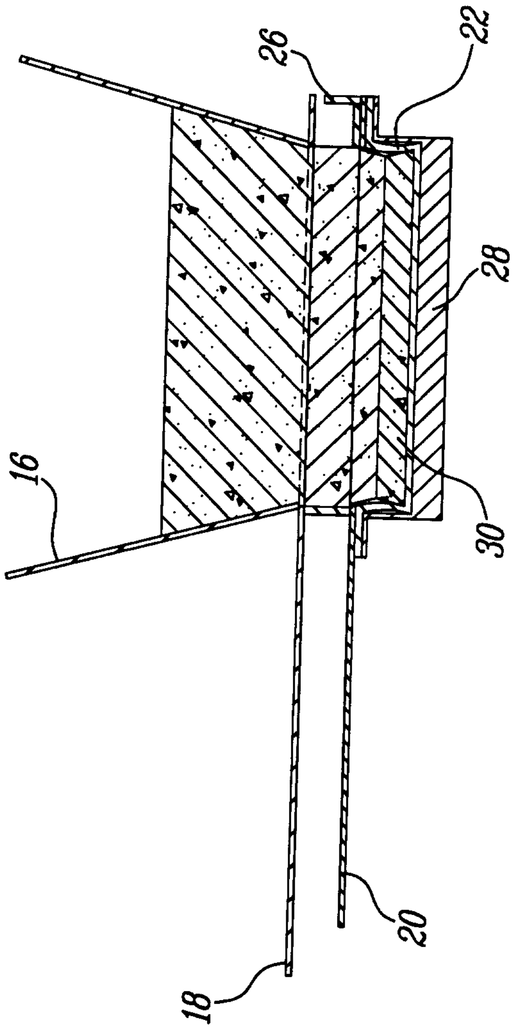
Figure 24:
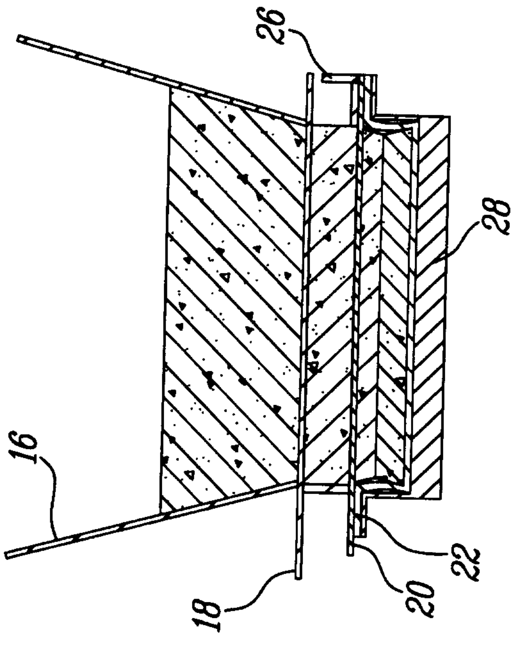
Figure 25:
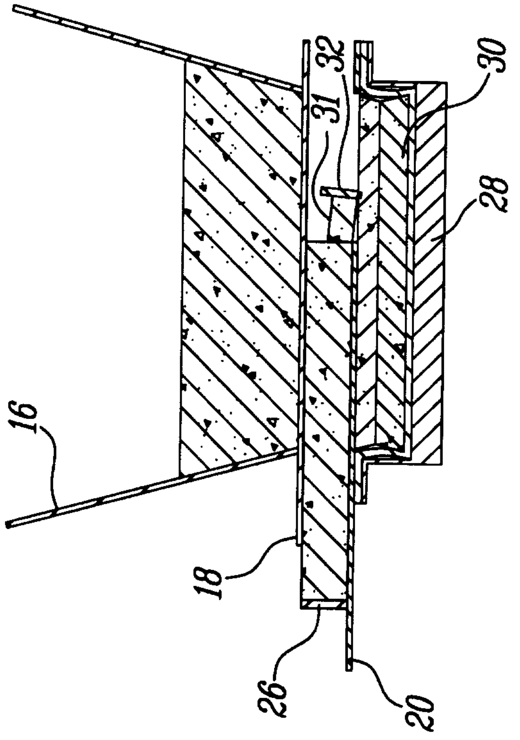
Figure 26:
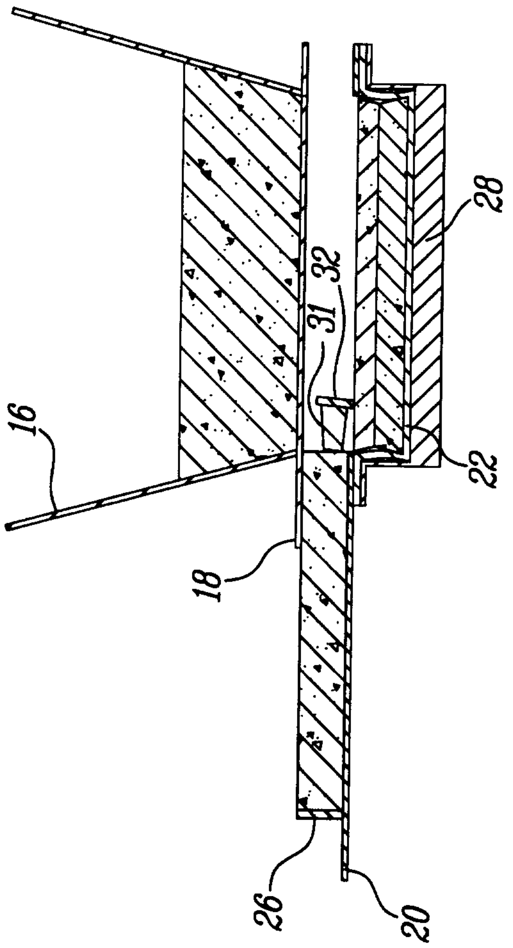
Figure 27:
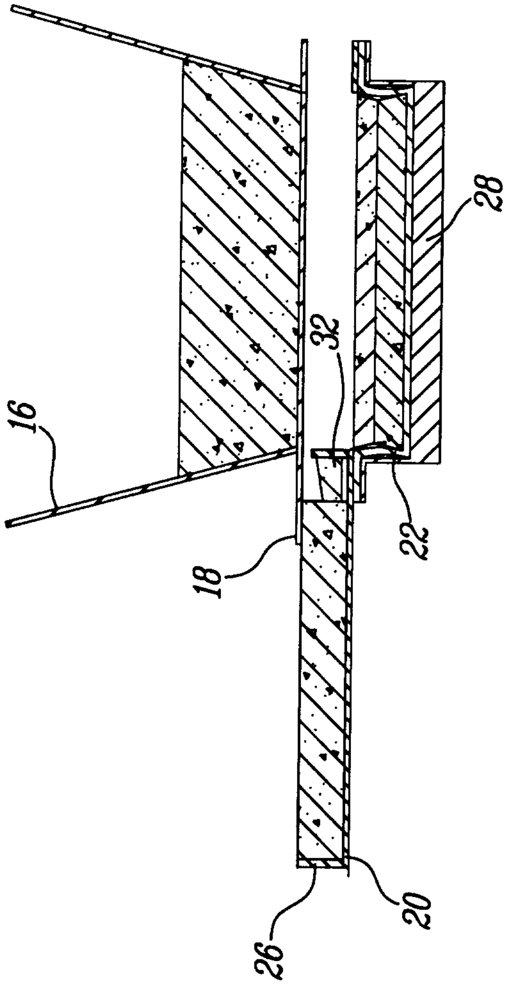
Figure 28:
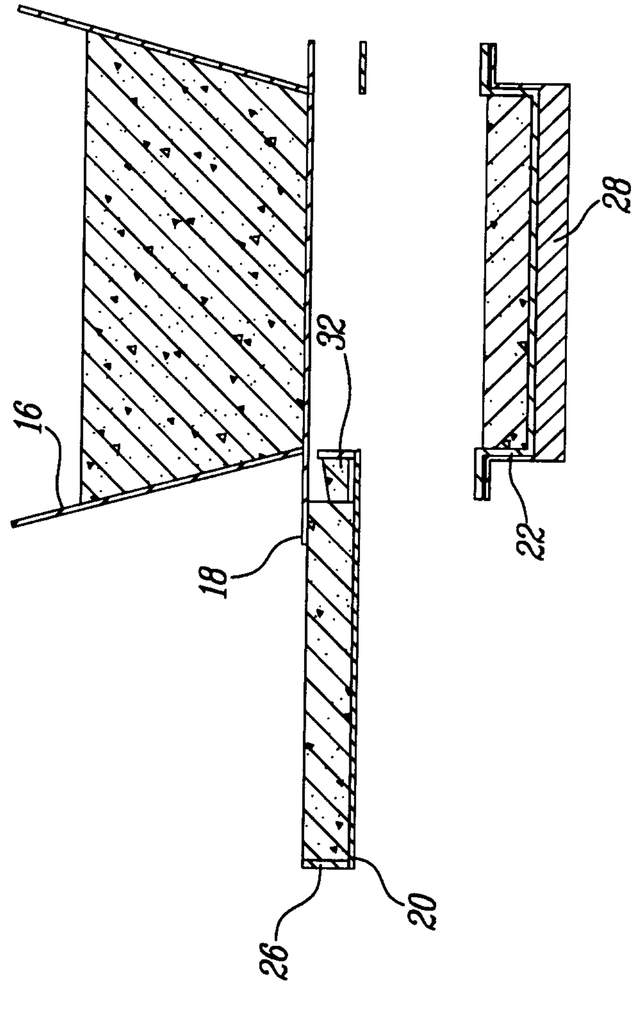

Then, the empty mold 22 is moved up towards the mouth of the hopper 16 (see FIGS. 19, 20), and the feedbox 26 and the lower door 20 are drawn under the closed upper door 18 until they are in position over the empty mold 22 (see FIG. 21). The lower door 20 is then opened to allow the amount of material 30 to be released from the feedbox 26 into the empty mold 22 (FIG. 22). Only then, the upper door 18 is opened to release additional wet moldable material from the hopper 16 down into the mold 22, pre-filled with the first amount of material 30 (FIG. 23). Once the mold 22 is filled, the lower door 20 is shut closed, as well as the upper door 18 (FIG. 24). The lower door 20 and the feedbox 26 are then withdrawn (FIGS. 25, 26, 27), and the mold 22 returned to the low position once filled (FIG. 28), and then brought to a maturation station, and replaced by a new empty mold (return to FIG. 18).

The new empty mold may be filled along the same acts as described hereinabove.

As may be seen from the Figures, the interior volume of the mold 22 may be reduced prior to filling, by a number of ways, including for example by buckling of the sidewalls of the mold 22 submitting the mold to a compression exerted by the hopper and the feedbox between the doors during pouring of the moldable material as described before, or having empty molds being fed in a line under the hopper and the feedbox through a passage putting them in a slight compression, for the pouring of the moldable material, as mentioned hereinabove.

In still another way, illustrated in FIGS. 20(*b*) and 22(*b*) for example, the mold 22 may comprise an upper circumferential flange 40 (FIG. 20(*b*), which is laterally compressed under action of the support 28, without buckling effect of the sidewalls (FIG. 22 (*b*)).

Furthermore, as may be seen in the Figures, the feedbox 26 may be provided with a scraper 32, so that, upon withdrawal of the lower door 20 and the feedbox 26, the scraper 32 removes material in excess 31 at the surface of the filled mold 22 (see FIGS. 25, 26), if any. This material in excess 31 (see FIGS. 18, 19) may then be released in the next empty mold (see FIG. 20).

It is found that a multiple-stage filling of a mold as described hereinabove, whereby a first amount of material is released in the mold in a first act, before a second amount of material is then poured in, allows obtaining a lower part of the molded article, corresponding to the first amount of material, devoid of bubbles or asperities.

As people in the art will appreciate, the mold 22 may be further connected to a vibration platform 24 as shown in FIG.

30, vertically displaceable by pneumatics and/or hydraulics as known in the art for example. Using pneumatic means may contribute to isolate the station from unwanted vibration. Such vibration platform may be actuated to agitate the mold 22 to promote a uniform distribution of the material therein.

Figure 30A:
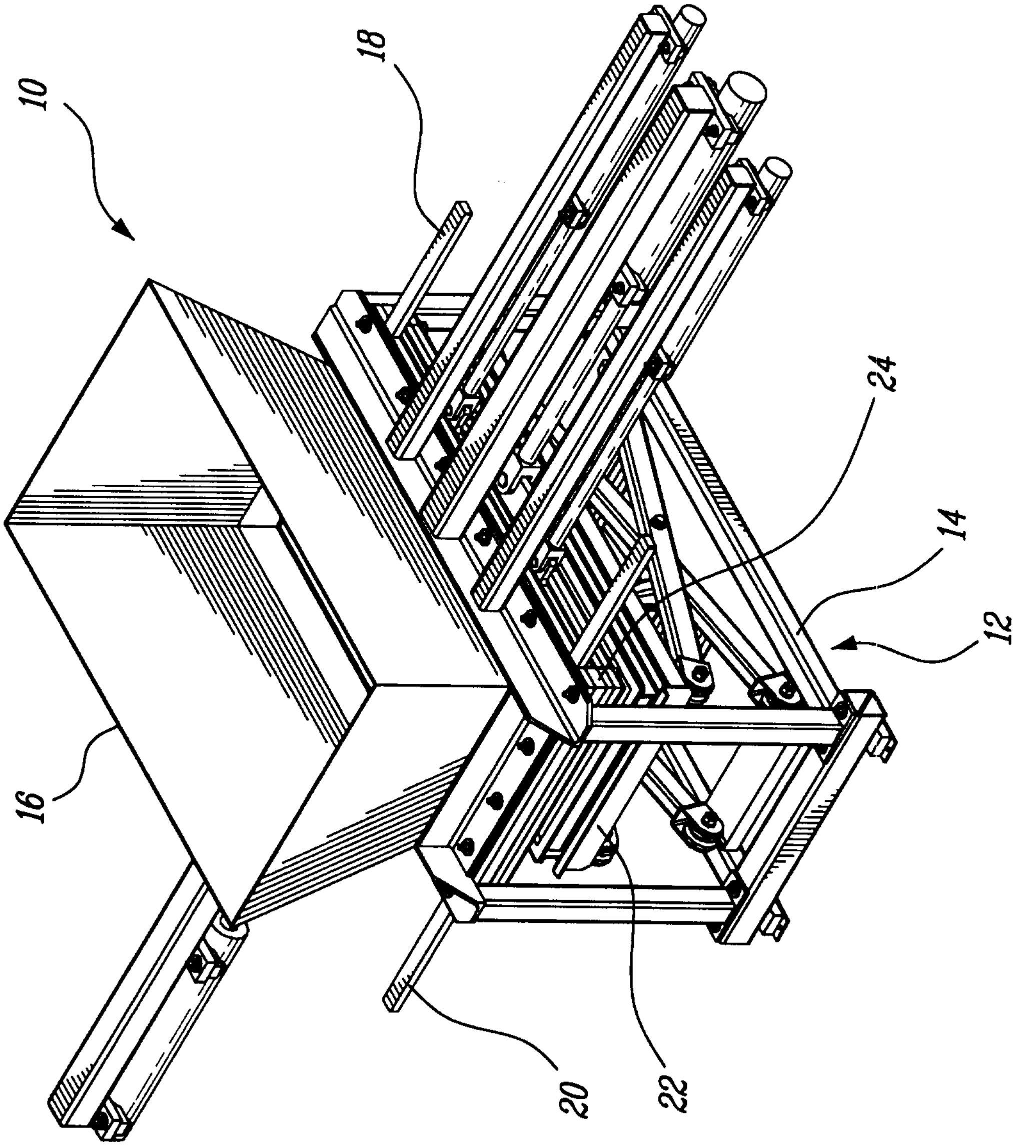
FIG. 30 illustrate A) a molding station, B) and C) a rotary arrangement according to further embodiments of the system of the present invention.
Figure 30C:
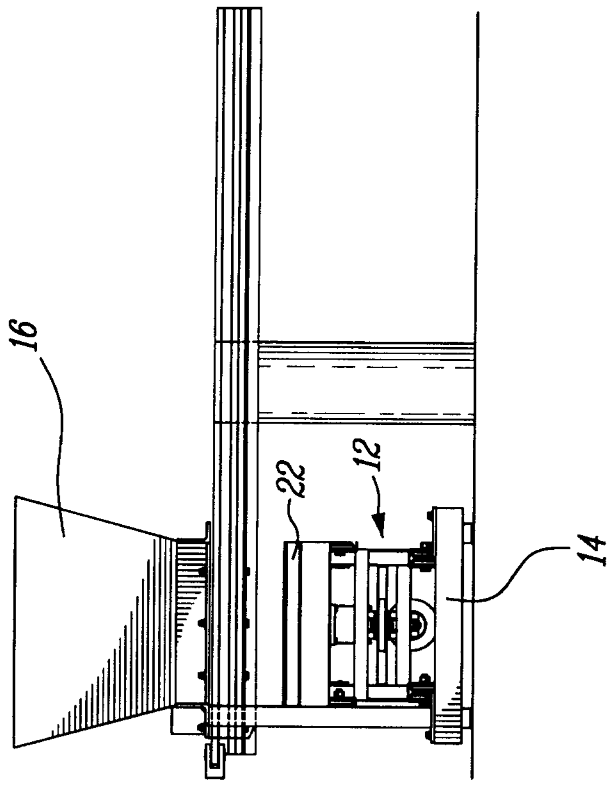
Figure 30B:
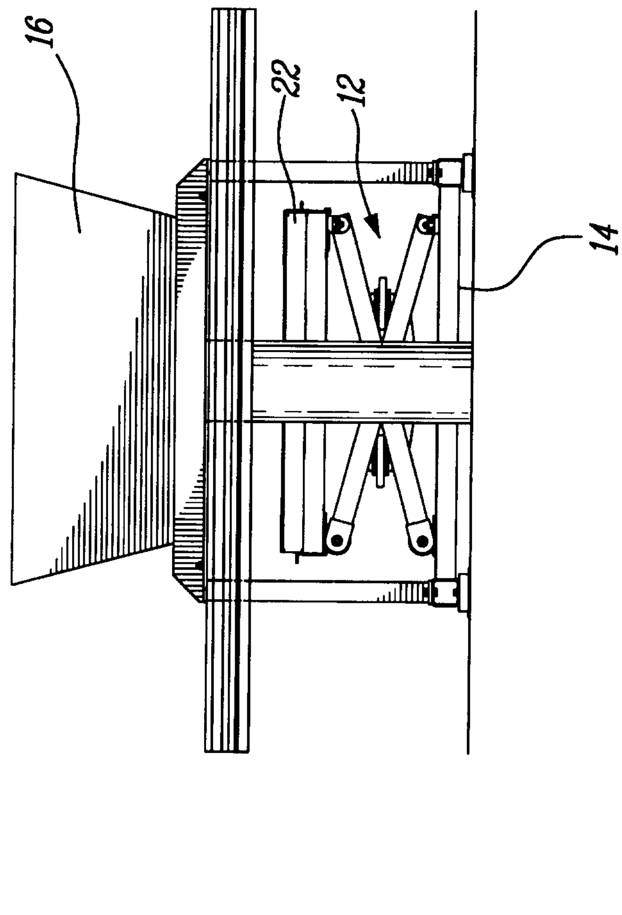

In the case of a mold displaceable up to and down from the mouth of the hopper, a lifting member, such as a scissor table 12, for example on a base 14, as shown in FIG. 30, or an air cushion table (not shown), may be used.

In the embodiments described hereinabove, the mold 22 and the hopper 16 are brought into a filling position by a movement of the mold 22 relative to the hopper 16. Obviously, the mold 22 could be fixed and the hopper 16 displaceable.

Figure 29:
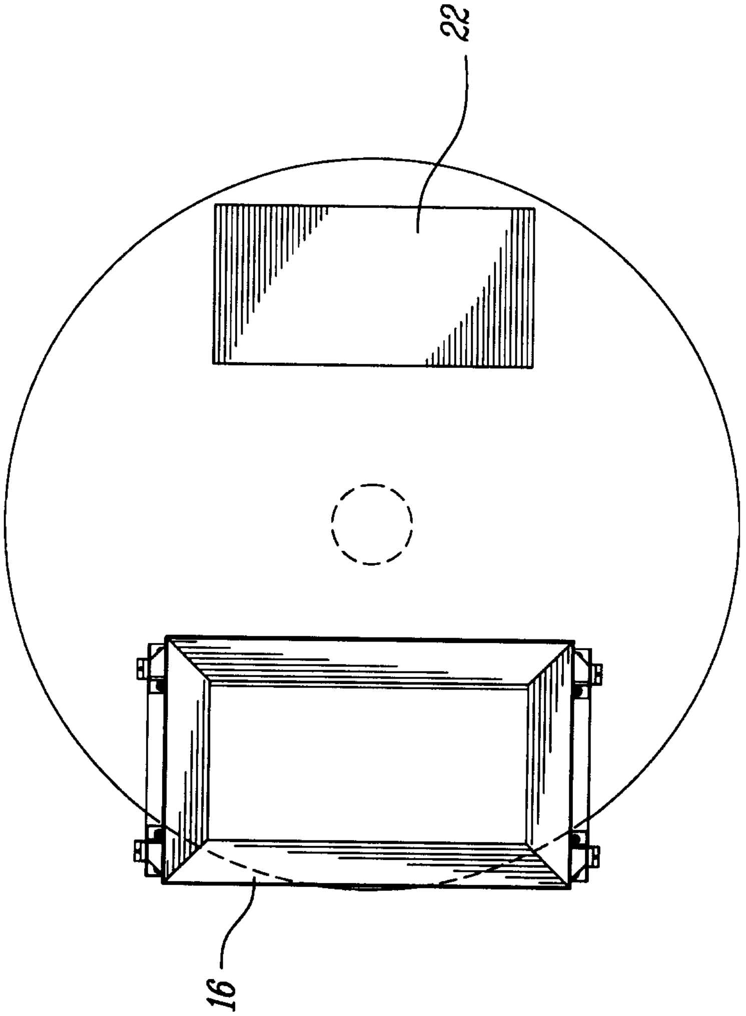
FIG. 29 illustrate a setting for a system according to an embodiment of another aspect of the present invention.

Moreover, a circular arrangement may be contemplated, as illustrated in FIGS. 29, 30(*b*) and 30(*c*), wherein the mold 22 is rotated in position under the hopper 16 for filling, or the hopper 16 is rotated over the mold 22 for filling.

Using a deformable mold 22, thus allows preventing overfilling of the mold 22, which may be further corrected by using a scraping action as described hereinabove.

Although the present invention has been described hereinabove by way of embodiments thereof, it may be modified, without departing from the nature and teachings of the subject invention as defined in the appended claims.

What is claimed is:

1. A molding station, comprising:

a container of a wet moldable material, said container having a mouth closable with at least a lower door;

a mold, said mold having a first interior volume at rest and being able to temporarily have a second interior volume, said second interior volume being inferior than said first interior volume, at least one of: i) said container and ii) said mold being movable into a filling position in which the container is closed by said lower door;

an overfilling control system, said overfilling control system comprising a support for said mold, said support being configured to compress said mold temporarily from said first interior volume to said second interior volume prior to or while releasing the wet moldable material in said mold, and to release said mold back to said first interior volume when said second interior volume is filled with said wet moldable material;

said lower door opening to allow an amount of the wet moldable material to be released into the mold as the mold is compressed to said second interior volume by said support, said lower door being brought back into a closed position and said support releasing the compression on said mold so that said mold retrieves said first interior volume when the second interior volume is full; and said mold being withdrawn from under the closed door, said lower door having a scraping action on the surface of the mold as the mold is withdrawn from under said closed lower door.

2. The molding station of claim 1, wherein at least one of: i) said container and ii) said mold is mobile one relative to the other.

3. The molding station of claim 1, further comprising a vibration platform connected to said mold for vibration of said mold.

4. The molding station of claim 1, wherein said mold is mounted on a lifting member.

5. The molding station of claim 1, wherein said container is a hopper.

6. The molding station of claim 1, wherein said wet moldable material is at least one material selected in the group consisting of: concrete, plaster, clay and sand-lime.

7. The molding station of claim 1, wherein said container further comprises an upper door located above said lower door and defines a compartment therebetween; said lower door opening to allow a first amount of the wet moldable material to be released from said compartment into the mold when said upper door above said lower door is closed, and then said upper door above said lower door opening to allow a second amount of the wet moldable material to be released into the mold.

8. A molding station, comprising:

a container of wet moldable material, said container having a lower door closing a mouth thereof, and an upper door located above said lower door and defining a compartment therebetween; and a mold, said mold being able to be temporarily deformed from a first interior volume to a second, reduced, interior volume, to be filled with the wet moldable material;

a support for said mold, said support operating said mold from said first interior volume to said second interior volume prior to or while releasing the wet moldable material in said mold and operating said mold back from said from said second interior volume to said first interior volume after the wet moldable material is released;

said container and said mold being brought into a filling position in which the container is closed by said lower door, said compartment comprises a first amount of material and the upper door above said lower door is closed; said lower door opening to allow the first amount of the wet moldable material to be released from the compartment into the mold, said upper door above said lower door then opening to allow a second amount of the wet moldable material to be released into the mold with said second interior volume; said lower door being then brought back into a closed position thereof, and said mold, back to said first interior volume, being withdrawn from under the closed lower door, said lower door having a scraping action on the surface of the mold as the mold is withdrawn from under said closed lower door.

9. The molding station of claim 8, wherein at least one of: i) said container and ii) said mold is mobile one relative to the other.

10. The molding station of claim 8, further comprising a vibration platform connected to said mold for vibration of said mold.

11. The molding station of claim 8, wherein said mold is mounted on a lifting member.

12. The molding station of claim 8, wherein said container is a hopper.

13. The molding station of claim 8, wherein said wet moldable material is at least one material selected in the group consisting of: concrete, plaster, clay and sand-lime.

14. The molding station of claim 1, wherein said container further comprises an upper door located above said lower door and a feedbox movable between said upper and lower doors; said lower door opening to allow a first amount of the wet moldable material to be released from said feedbox into the mold when said upper door is closed, and then said upper door opening to allow a second amount of the wet moldable material to be released into the mold.

15. A molding station, comprising:

a container of a wet moldable material, said container having a lower door closing a mouth thereof, and an upper door located above said lower door;

a feedbox movable between said upper door and said lower door of said feedbox; and a mold, said mold being reversibly deformable between a first interior volume and a second reduced interior volume, to be filled with the wet moldable material;

a support for said mold, said support operating said mold from said first interior volume to said second interior volume prior to or while releasing the wet moldable material in said mold and operating said mold back from said from said second interior volume to said first interior volume after the wet moldable material is released;

wherein said container, said feedbox and said mold are brought into a filling position in which said container and said mold are separated by said feedbox, said lower door and said upper door above said lower door are closed and said feedbox contains a first amount of the wet moldable material; said lower door then opening to allow the first amount of wet material to be released from the feedbox into the mold; and said upper door above said lower door further opening to release a second amount of the wet material into the mold, said lower door and said upper door above said lower door shutting closed when said mold is filled, said lower door and said feedbox being then withdrawn and the mold and the container returned to a separated position, said lower door having a scraping action on the surface of the mold as said lower door and said feedbox are withdrawn.

16. The molding station of claim 15, wherein said feedbox comprises a scraper, said scraper removing wet moldable material in excess at the surface of the mold upon withdrawal of said lower door and said feedbox.

17. The molding station of claim 15, wherein at least one of: i) said container and ii) said mold is mobile one relative to the other.

18. The molding station of claim 15, further comprising a vibration platform connected to said mold for vibration of said mold.

19. The molding station of claim 15, wherein said mold is mounted on a lifting table.

* * * * *